United States Patent
Lo

[19]

[11] Patent Number: 5,960,034
[45] Date of Patent: Sep. 28, 1999

[54] EXPANDABLE REPEATER WITH BUILT-IN TREE STRUCTURE ARBITRATION LOGIC

[75] Inventor: William Lo, Santa Clara, Calif.

[73] Assignee: Advanced Micro Devices, Inc., Sunnyvale, Calif.

[21] Appl. No.: 08/566,394

[22] Filed: Dec. 1, 1995

[51] Int. Cl.⁶ ..................................................... H04B 3/36
[52] U.S. Cl. .......................... 375/211; 375/212; 370/445; 370/447
[58] Field of Search ..................................... 375/211, 213, 375/377, 212; 370/445, 446, 447, 492, 315, 243

[56] References Cited

U.S. PATENT DOCUMENTS

| | | | |
|---|---|---|---|
| 5,265,123 | 11/1993 | Vijeh et al. | |
| 5,351,241 | 9/1994 | Yehonatan | 370/446 |
| 5,517,520 | 5/1996 | Chi | 370/446 |
| 5,631,905 | 5/1997 | Yano | 370/462 |
| 5,717,714 | 2/1998 | Anderson et al. | 370/446 |

FOREIGN PATENT DOCUMENTS

| | | |
|---|---|---|
| 0 173 508 A2 | 3/1986 | European Pat. Off. . |
| 0 467 583 A1 | 1/1992 | European Pat. Off. . |
| 0 495 575 A1 | 7/1992 | European Pat. Off. . |
| 0 596 694 A1 | 5/1994 | European Pat. Off. . |

*Primary Examiner*—Don N. Vo
*Attorney, Agent, or Firm*—Townsend and Townsend and Crew LLP

[57] ABSTRACT

An apparatus and method for shortening propagation delays of a plurality of repeater circuits that are interconnected to form a single repeater. A tree structure that organizes the plurality of repeater circuit so that an activity signal from one repeater circuit is propagated to other repeater circuits via a multi-branching network wherein a downstream repeater circuit is connected to at least two upstream repeater circuits. Any particular repeater circuit notifies the other repeater circuits, via an expansion bus, of a collision whenever two or more upstream indicator signals are asserted, or when at least one upstream indicator signal is asserted and the particular repeater circuit has one port active, or when the particular repeater circuit has multiple ports active. Each repeater circuit asserts an indicator signal to a downstream repeater circuit whenever one of its upstream indicator signals are active or one of its ports is active. An alternate embodiment provides for selective control of the repeater circuits via a mode control that permits tree operation or uses an external arbiter.

12 Claims, 5 Drawing Sheets

EXPANDABLE REPEATER WITH BUILT-IN TREE STRUCTURE ARBITRATION LOGIC

BACKGROUND OF THE INVENTION

The present invention relates generally to repeaters used in computer networks. Specifically, the invention relates to semiconductor integration of a plurality of transceiver ports with repeater functionality while retaining a port expansion capability for the integrated repeater.

U.S. Pat. No. 5,265,123 hereby expressly incorporated by reference for all purposes, provides an effective solution to port expansion capability for repeaters, particularly for integrated repeaters. FIG. 1 is a block schematic diagram of a repeater 10 implemented according to an embodiment of U.S. Pat. No. 5,265,123.

Repeater 10 includes three Integrated Multi-port Repeaters (IMR) $12_i$ coupled together to form the single repeater 10. Details regarding making and using repeater 10 are included in the incorporated U.S. Pat. No. 5,265,123 and will not be further described herein. An important aspect of the coupling of the IMRs 12 is that they collectively operate together so as to form a single synchronized repeater. As noted, repeater 10 has three times the number of data ports as a single IMR 12, thereby providing a coupling that effectively expands the number of ports of a single IMR 12.

An expansion port function of each IMR 12 includes an output request (REQ) signal, an input acknowledge (ACK) signal, an input collision (COL) signal, a bidirectional data (DAT) signal and a bidirectional JAM signal. An expansion bus 14 intercouples the individual IMRs 12 making repeater 10. Expansion bus 14 includes the DAT and JAM signals. In one preferred embodiment of U.S. Pat. No. 5,265,123, repeater 10 includes an arbiter module 16 that facilitates expansion bus 14 contention resolution and helps to synchronize collision state machines included in an IMR 12 upon detection of a collision. Arbiter 16 detects collision conditions by sensing multiple requests for access to expansion bus 14. Detection of a collision condition results in arbiter 16 asserting the COL signal to each IMR 12.

Repeater 12 is an effective solution to port expandability of integrated repeater semiconductor devices. A need is developing, however, for very low cost solutions to the problem of repeater port expandability. A solution such as shown in FIG. 1 is not a lowest cost solution due to the use of the external arbiter.

FIG. 2 is an alternate preferred embodiment from U.S. Pat. No. 5,265,123 that includes a repeater 20 that includes three IMRs 22. IMRs 22 are daisy-chained together to provide a single repeater. Each IMR 22 includes an internal arbiter function. Each IMR 22 includes a LINK IN port, a LINK OUT port, a COL port and a DAT port. Any particular IMR 22 will assert LINK OUT as long as LINK IN is asserted and no port on the particular IMR 22 is asserted. Each IMR 22 will assert the COL signal when multiple ports on a single IMR 22 are receiving OR when a single port is receiving and LINK IN is not asserted. Additional details regarding operation of repeater 20 are provided in U.S. Pat. No. 5,265,123.

While the implementation shown in FIG. 2 is a lower cost solution, propagation delays through the daisy-chained IMRs 22 effectively limits the degree of expandability of repeater 20.

SUMMARY OF THE INVENTION

The present invention provides apparatus and method for simply, efficiently and economically improving upon the port expandability of daisy-chained repeaters. Implementation of an embodiment of the present invention permits a low-cost solution to the problem of port expandability of an integrated repeater while overcoming limitations on that expandability that arise from propagation delays.

According to one aspect of the invention, it includes a repeater, including: a shared data bus; a first and a second repeater circuit, each repeater circuit having: a plurality of ports for receiving and transmitting data; an expansion port coupled to said shared data bus; and an activity indicator output port; and a third repeater circuit including a plurality of ports for receiving and transmitting data and having a first activity indicator input port coupled to said activity indicator output port of said first repeater circuit, a second activity indicator input port coupled to said activity indicator output port of said second repeater circuit, an expansion port coupled to said shared data bus, and a controller for asserting a collision indication signal to said shared data bus through said expansion port of said third repeater circuit when said activity indicator input ports indicate receive activity on said first and second repeater circuits or when one of said activity indicator input ports indicate receive activity on one of said first and second repeater circuits and said third repeater circuit is concurrently receiving data.

Reference to the remaining portions of the specification, including the drawing and claims, will realize other features and advantages of the present invention. Further features and advantages of the present invention, as well as the structure and operation of various embodiments of the present invention, are described in detail below with respect to accompanying drawing. In the drawing, like reference numbers indicate identical or functionally similar elements.

DESCRIPTION OF THE PREFERRED EMBODIMENT

Figure 3:
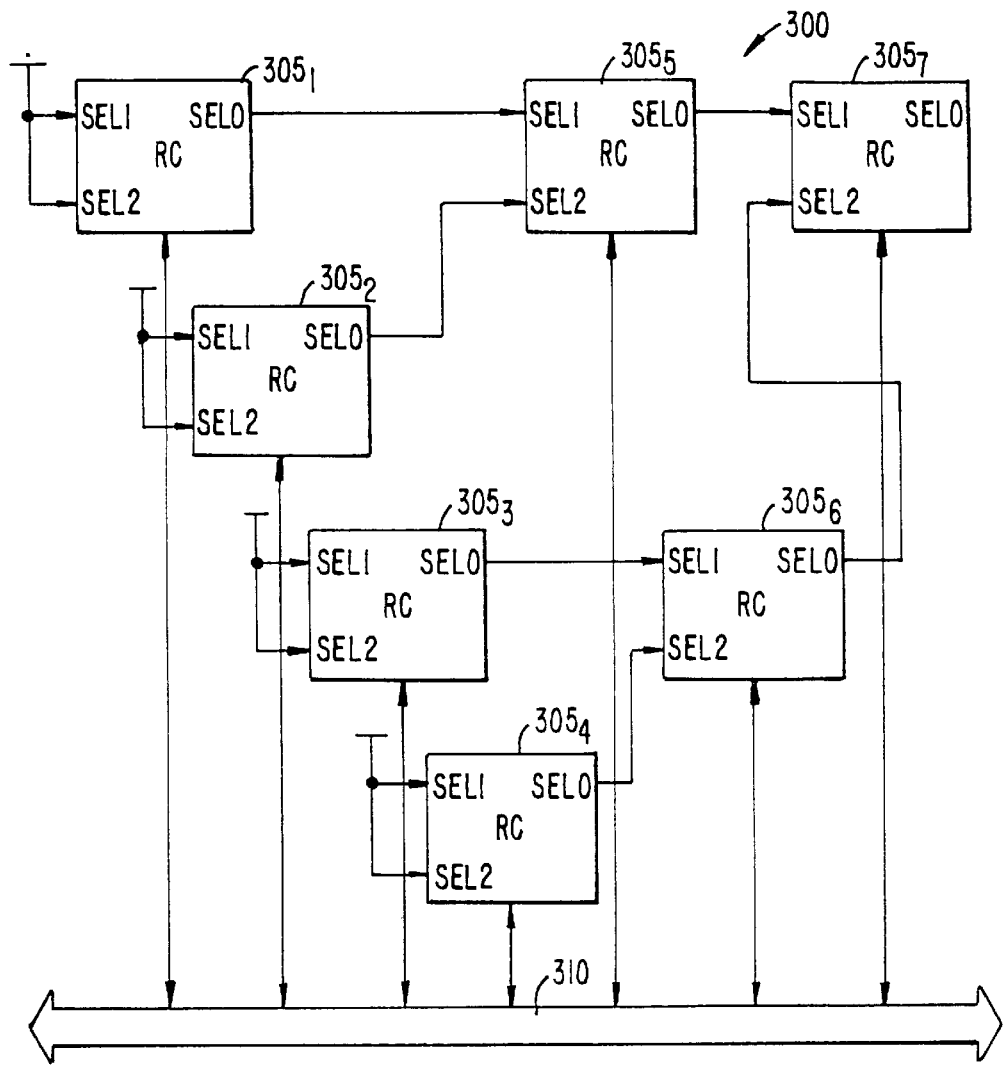
FIG. 3 is a block schematic diagram of a preferred embodiment of the present invention.

FIG. 3 is a block schematic diagram of a preferred embodiment of the present invention. An expanded repeater 300 includes a plurality of expandable repeater circuits $305_i$ coupled to an expansion bus 310. Each repeater circuit 305 includes a plurality of ports for reception and transmission of data. Each repeater circuit 305 includes logic and control elements, not shown, that function to permit any single repeater circuit 305 to operate as a repeater.

An IEEE Standard, 802.3, (hereby expressly incorporated by reference) defines one type of repeater that is implemented by each repeater circuit 305 of the preferred embodiment. The incorporated U.S. Pat. No. 5,265,123 also teaches an implementation of a repeater circuit. Repeater circuits 305, in the preferred embodiment, are integrated into semiconductor packages as well known in the art. As a consequence, each packaged repeater circuit 305 has a predefined number of data ports. As discussed earlier, one advantage of the present invention is to permit formation of expanded repeater 300 that increases the number of data ports found on a single repeater circuit 305. Expanded repeater 300, even though it includes two or more repeater circuits 305 (with the corresponding increase in the number of data ports), affects any network of which it is a part as a single repeater.

As the present invention is an enhancement to the existing expandable repeater invention described in the incorporated US patent, details regarding synchronization of state machines and other implementation details will not be described herein. The present discussion focusses on improving expanded repeater 300 function over a strictly daisy-chain implementation without resorting to use of external arbiter functions that can increase cost or complexity. In addition, aspects of the invention relating to use of one type of repeater circuit in another environment are discussed. In other words, providing for a mode switch or use with an external arbiter is possible.

Each repeater circuit 305 includes, in addition to a plurality of data ports, a first and a second activity indicator input port (identified as select input (SELI1 and SELI2)), an activity indicator output port (SELO), and an expansion port 310. The activity indicator input ports accept a binary value indicator signal. Deassertion of the indicator signal means that no upstream repeater circuit 305 is receiving an input data packet. Assertion of the indicator signal means that at least one of the upstream repeater circuits 305 is receiving an input data signal.

Any repeater circuit 305 that receives an asserted indicator signal at one of its activity indicator input ports OR that receives an input data packet, asserts its output indicator signal. Any repeater circuit 305 that does not receive an asserted input indicator signal AND that does not receive and input data packet, deasserts its output indicator signal. Any repeater circuit 305 that is an upstream-most repeater circuit in any path has its activity indicator input ports tied to a respective voltage level to indicate a deassertion of the input indicator signal. As well understood in the art, a signal may be deasserted by either a "HIGH" or a "LOW" binary value. In the preferred embodiment, the activity indicator signals are active low, meaning that an assertion of the signal is a "LOW" binary value. As explained above, repeater circuits $305_1$–$305_4$, each being an upstream-most repeater circuit, have the activity indicator input ports all tied to a binary "HIGH" value, meaning that they are deasserted.

Each repeater circuit 305 monitors both of the input indicator signals and the input data ports to detect a collision condition for expanded repeater 300. When (a) two input indicator signals are asserted OR (b) one input indicator signal is asserted AND when at least one input port is receiving an input data packet, OR (c) two or more input ports are receiving input data packets concurrently, a particular repeater circuit $305_x$ detecting one of these events determines a collision condition exists for expanded repeater 300. The particular repeater circuit $305_x$ signals the collision condition to the other repeater circuits 305 of expanded repeater 300. In the preferred embodiment, an easy way to signal the collision condition is to assert a collision signal on expansion bus 310 that is detected by other repeater units. Other embodiments may signal the collision condition using a different mechanism.

Figure 2:
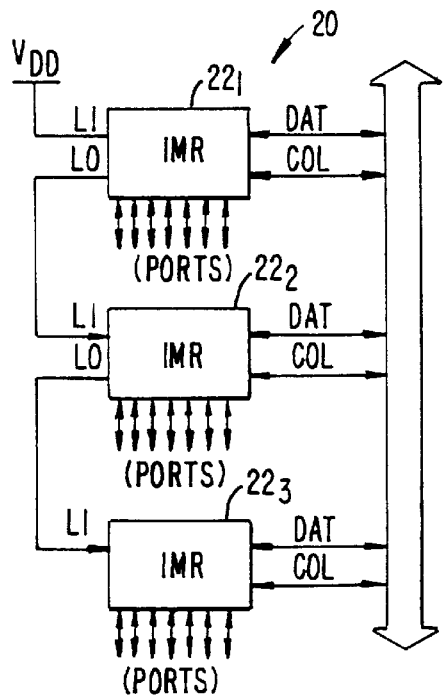
FIG. 2 is a block schematic diagram of an alternate prior art expandable repeater.

Propagation delay of an activity indication signal is much improved over the strictly daisy-chain approach that is shown in FIG. 2. Even though expanded repeater 300 includes seven repeater units $305_1$–$305_7$, any particular repeater unit 305 has no more than two upstream repeater units.

Figure 4:
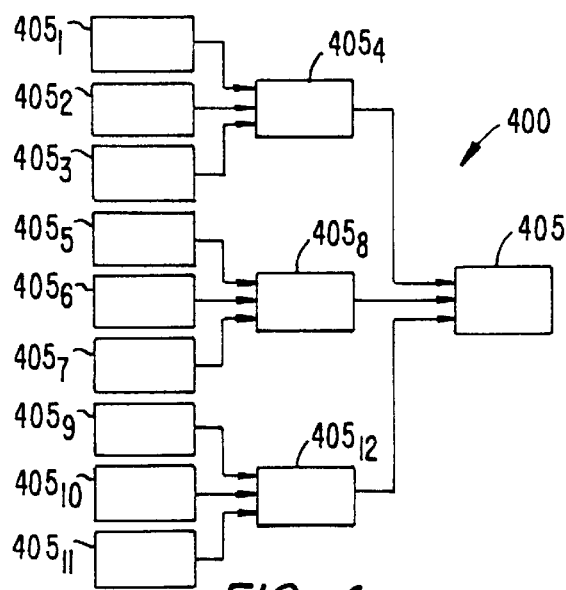
FIG. 4 is a block schematic diagram of an alternate preferred embodiment of the present invention.

FIG. 4 is a block schematic diagram of an alternate preferred embodiment of the present invention used in an expanded repeater 400. Expanded repeater 400 includes thirteen repeater circuits $405_i$. Repeater circuit 405 is similar to repeater circuit 305 shown in FIG. 3 with repeater circuit 405 including three activity indicator input ports as opposed to the two included with repeater circuit 305. By including three activity indicator input ports, more repeater circuits 405 are able to be used while maintaining a limit on the number of upstream repeater units for any particular activity indicator input port. Expanded repeater 400 also has no more than two upstream repeater circuits per activity indicator input port. The two repeater circuit limit provided for in expanded repeater 300 and in repeater 400 are representative of one embodiment. The present invention is not limited to a maximum of two upstream repeater circuits per activity indicator input port. In some embodiments, the number of upstream repeater units may be very large. Timing requirements and other considerations contribute to establishing an upper limit to the number of upstream repeater circuits.

Table I below illustrates the correspondence between a desired chip delay and a number of activity indicator input ports needed when using the preferred embodiment (for x greater than or equal to two). The value in the table is the maximum number of repeater units for the indicated parameters. For example, as shown in FIG. 3, for a two chip delay, two activity indicator input port configuration of an expanded repeater, a maximum number of repeater units is seven.

TABLE I

| | NUMBER OF SELIx INPUTS | | | |
|---|---|---|---|---|
| Chip Delay | 1 (Daisy Chain) | 2 | 3 | n |
| 1 | 1 | 1 | 1 | 1 |
| 2 | 2 | 3 | 4 | $(n + 1)$ |
| 3 | 3 | 7 | 13 | $(n^{3-1})/(n - 1)$ |
| m | m | $2^{m-1}$ | $(3^{m-1})/2$ | $(n^{m-1})/(n - 1)$ |

Figure 1:
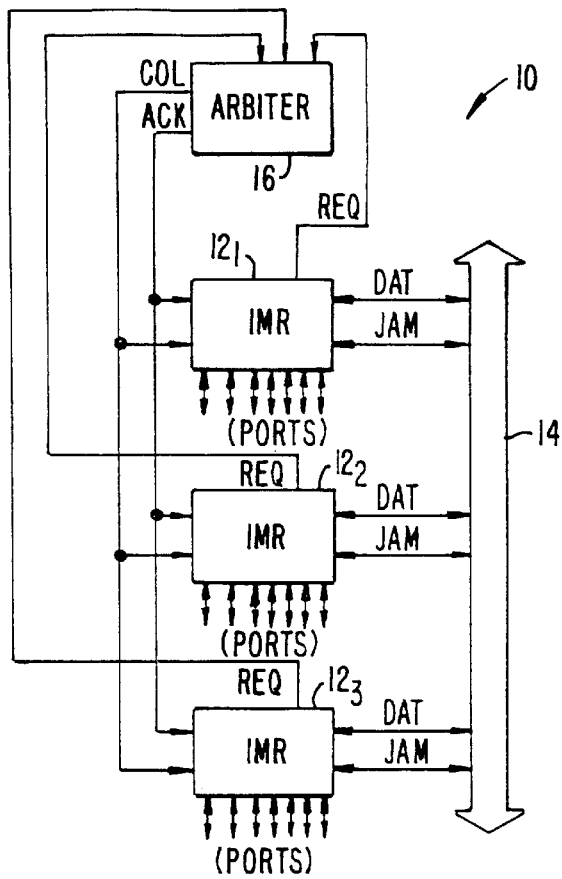
FIG. 1 is a block schematic diagram of a prior art expandable repeater.

Table I illustrates visually some of the advantages of the present invention. The column for x=1 is the daisy chain case illustrated in FIG. 2. Note that for a chip delay of 1, a maximum number of repeater units is also 1. An external arbiter function, such as illustrated in FIG. 1, effectively addresses this condition.

Figure 5:
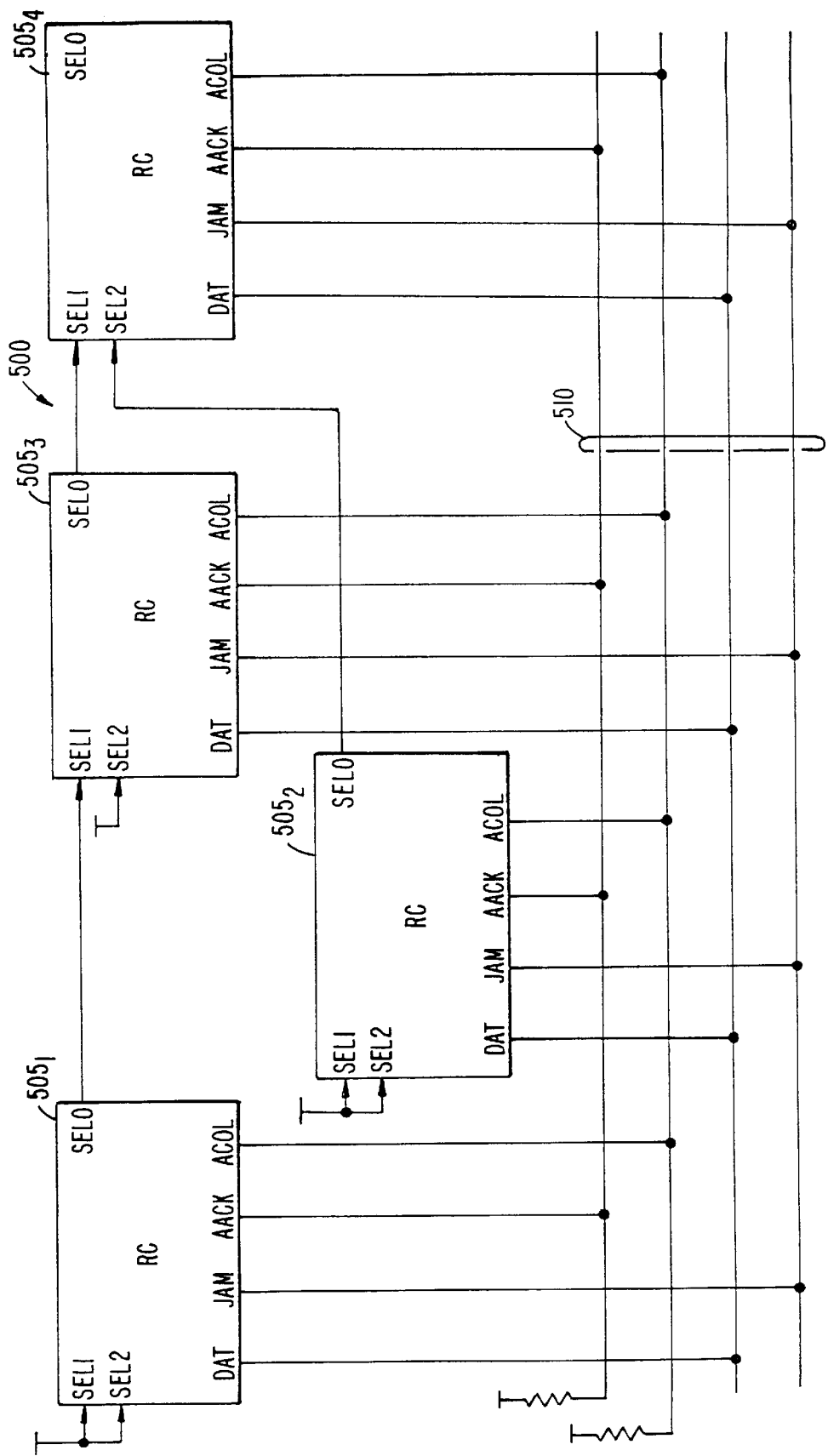
FIG. 5 is a block schematic diagram of an expanded repeater according to one aspect of the present invention wherein less than a full complement of repeater chips are used in the expanded repeater.

FIG. 5 is a is a block schematic diagram of an expanded repeater 500 according to one aspect of the present invention wherein less than a full complement of repeater circuits 505 are used. While Table I identifies a maximum number of repeater circuits 505, some implementations will use fewer repeater circuits 505, as determined by the desired number of ports.

As shown, expanded repeater 500 includes four repeater circuits $505_1$–$505_4$, each with two SELI ports and one SELO port. Repeater circuit $505_1$ and $505_2$ have both SELI ports coupled to a binary "HIGH" to deassert the input activity indicator signals of these ports. SELO of repeater circuit $505_1$ is coupled to one SELI port of repeater circuit $505_3$, with the other SELI port of repeater circuit $505_3$ coupled to the binary "HIGH" source. SELO of repeater circuit $505_2$ and SELO of repeater circuit $505_3$ are each coupled to one of the SELI ports of repeater circuit $505_4$.

An expansion bus 510 couples each repeater circuit 505 to the others. Expansion bus 510 includes a DAT line, a JAM line, an ACOL line and an AACK line. The DAT line is an input/output that transfers data between repeater circuits. The JAM line is an input/output that indicates that a collision is occurring between ports of only one repeater circuit. The AACK is an active low, open drain signal line that indicates that only one repeater circuit 505 is receiving an input packet. Upon receiving an assertion of the AACK signal, the repeater circuit receiving the AACK signal has control of the DAT and JAM lines to use as appropriate. AACK is externally pulled HIGH by an external resistor as well known for open drain signal lines. ACOL is an active low open drain signal line that indicates that there are more than one repeater circuits that are receiving packets. ACOL is also externally pulled high with a resistor. Details regarding operation of expansion bus 510 will be further explained below with reference to FIG. 6.

Figure 6:
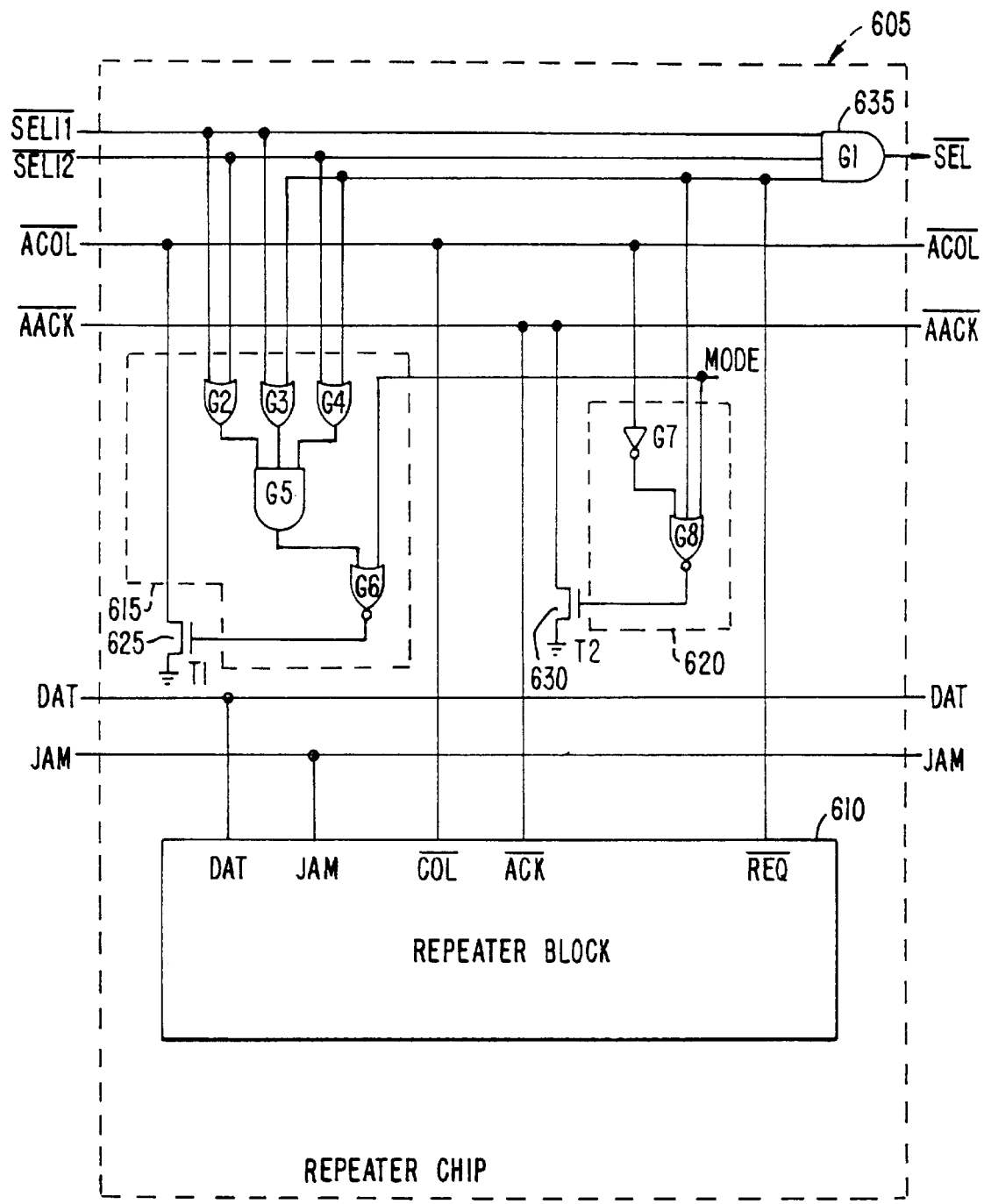
FIG. 6 is a block schematic diagram of an alternate preferred embodiment in which an expandable repeater chip designed for use with an external arbiter is configured according to one aspect of the present invention.

FIG. 6 is a is a block schematic diagram of an alternate preferred embodiment in which an expandable repeater chip 605 having a repeater block 610 designed for use with an external arbiter (not shown). By adding a first combinatorial logic block 615 and a second combinatorial logic block 620, each responsive to a mode signal, a first transistor 625 and a second transistor 630, and a suitably sized logical product gate 635, repeater block 610 is transferred to an implementation that can be used in either environment, depending upon the status of a mode signal. The size of gate 635 depends upon the number of upstream SELI inputs per repeater chip 605. In the case of two SELI inputs, gate 635 has three inputs, one for each SELI input, and one for a signal from repeater block 610 that indicates port activity of repeater chip 605. The output of gate 635 is the SELO port.

When the mode signal has a first state, repeater chip 605 operates in conjunction with an external arbiter as described in the incorporated U.S. Pat. No. 5,265,123. In the external arbiter mode, the expansion bus includes the DAT, JAM, COL, REQ and ACK signals. When the mode signal has a second state, repeater chip 605 operates as described above with respect to repeater circuit 305 shown in FIG. 3. In the tree configuration, the expansion bus includes the DAT, JAM, COL, and ACK signals. In an alternate preferred embodiment, the operational mode may be controlled by a mode control register that is programmable to select tree mode or arbiter mode.

Figure 7:
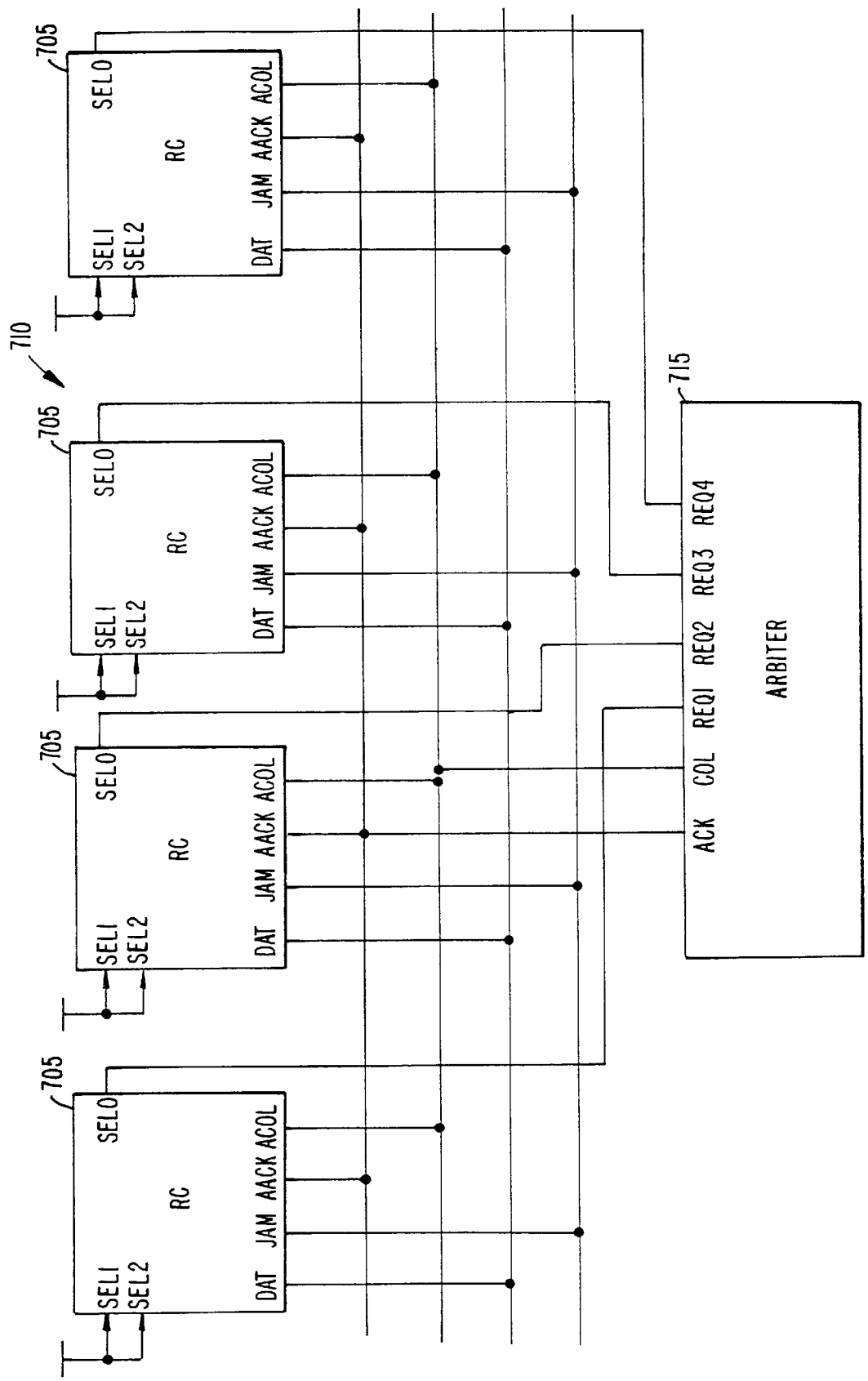
FIG. 7 is a block schematic diagram of an alternate preferred embodiment illustrating use of a set of expandable repeater devices to form an expanded repeater having an external arbiter function.

FIG. 7 is a is a block schematic diagram of an alternate preferred embodiment illustrating use of a set of expandable repeater devices $705_i$ to form an expanded repeater 710 implemented using an external arbiter 715. The expandable repeater devices 705 are functionally equivalent to repeater circuits $305_i$ shown in FIG. 3. External arbiter 715 may be implemented in any of several ways. One suitable arbiter 715 is described in the incorporated U.S. Pat. No. 5,265,123.

In conclusion, the present invention provides a simple, efficient solution to a problem of improved propagation delay of expandable repeaters implemented without external arbiters. While the above is a complete description of the preferred embodiments of the invention, various alternatives, modifications, and equivalents may be used. Therefore, the above description should not be taken as limiting the scope of the invention which is defined by the appended claims.

What is claimed is:

1. A repeater, comprising:
   a shared data bus;
   a first repeater circuit and a second repeater circuit, each repeater circuit having:
      a plurality of ports for receiving and transmitting data;
      an expansion port coupled to said shared data bus; and
      an activity indicator output port; and
   a third repeater circuit including a plurality of ports for receiving and transmitting data and having a first activity indicator input port coupled to said activity indicator output port of said first repeater circuit, a second activity indicator input port coupled to said activity indicator output port of said second repeater circuit, an expansion port coupled to said shared data bus, and a controller for asserting a collision indication signal to said shared data bus through said expansion port of said third repeater circuit when said activity indicator input ports indicate receive activity on said first and second repeater circuits as well as when one of said activity indicator input ports indicate receive activity on one of said first and second repeater circuits and said third repeater circuit is concurrently receiving data.

2. A repeater circuit, comprising:
   a plurality of ports for receiving and transmitting data;
   a first activity indicator input port and a second activity indicator input port;
   an expansion port; and
   a controller for asserting a collision indication signal on said expansion port when said first and second activity indicator input ports each receive an indicator signal.

3. The repeater circuit of claim 2 wherein said controller asserts said collision indication signal when either of said activity indicator input ports receive said indicator signal and one of said plurality of ports receives data.

4. The repeater circuit of claim 2 further comprising an activity indicator output port for asserting an indicator signal when one of said plurality of ports receives data.

5. The repeater circuit of claim 2 further comprising an activity indicator output port for asserting an indicator signal when one of said indicator input ports is active.

6. The repeater circuit of claim 4 wherein said activity indicator output port also asserts said indicator signal when one of said indicator input ports is active.

7. The repeater circuit of claim 2 wherein said ports are coupled to a predetermined number of pins of a semiconductor package enclosing said ports and said controller.

8. The repeater circuit of claim 2 further comprising a mode control input, the repeater circuit operating in an arbiter mode when said mode control input has a first value and the repeater circuit operating in a tree mode when said mode control input has a second value.

9. The repeater circuit of claim 7 wherein said semiconductor package includes a mode control input pin, the repeater circuit operating in an arbiter mode when said mode control input pin has a first value and the repeater circuit operating in a tree mode when said mode control input pin has a second value.

10. The repeater circuit of claim 2 further comprising:
    a mode control register, coupled to said controller, for programmably controlling an operational mode of the repeater circuit, the repeater circuit operating in an arbiter mode when said mode control register stores a first value and the repeater circuit operating in a tree mode when said mode control register stores a second value.

11. A method for operating a repeater comprised of a first, a second, and a third repeater circuit, the repeater circuits each included with a semiconductor package having a predetermined number of pins, comprising the steps of:

receiving a first data packet at a first port of the first repeater circuit;

transmitting said first data packet from a second port of the first repeater circuit;

driving an expansion port of the first repeater circuit with said first data packet;

receiving said first data packet at an expansion port of the second repeater circuit and at an expansion port of the third repeater circuit;

transmitting said first data packet from a second port of the second repeater circuit and transmitting said first data packet from a second port of the third repeater circuit;

driving a first receive activity indicator signal from an indicator output port of the first repeater circuit when the first repeater circuit receives said data packet;

receiving a second data packet at a first port of the second repeater circuit;

driving a second receive activity indicator signal from an indicator output port of the second repeater circuit when the second repeater circuit receives said second data packet;

receiving said first receive activity indicator signal at a first indicator input port of the third repeater circuit;

receiving said second receive activity indicator signal at a second indicator input port of the third repeater circuit; and asserting a collision indication signal from the third repeater circuit to the first and second repeater circuit when said first receive activity indicator signal and said second receive activity indicator signal are concurrently received by the third repeater circuit.

12. A repeater circuit, comprising:

a plurality of ports for receiving and transmitting data;

a first and a second activity indicator input port;

an expansion port; and a controller, coupled to said ports, for asserting a collision indication signal on said expansion port when said first and second activity indicator input ports each receive an indicator signal from a different source.

* * * * *